US011212068B1

(12) United States Patent
Liu et al.

(10) Patent No.: US 11,212,068 B1
(45) Date of Patent: Dec. 28, 2021

(54) CARRYING A TIMESTAMP IN RADIO OVER ETHERNET

(71) Applicant: Ciena Corporation, Hanover, MD (US)

(72) Inventors: Xiaojin Liu, Ottawa (CA); Vahid Naraghi, San Jose, CA (US); Bashar Abdullah, Kanata (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/001,255

(22) Filed: Aug. 24, 2020

(51) Int. Cl.
*H04L 7/04* (2006.01)
*H04L 7/00* (2006.01)
*H04L 12/46* (2006.01)

(52) U.S. Cl.
CPC .......... *H04L 7/0008* (2013.01); *H04L 7/0041* (2013.01); *H04L 7/0079* (2013.01); *H04L 7/0091* (2013.01); *H04L 12/4633* (2013.01); H04L 2212/00 (2013.01)

(58) Field of Classification Search
CPC ... H04L 7/0008; H04L 7/0091; H04L 7/0041; H04L 12/4633; H04L 7/0079; H04L 2212/00; H04J 3/0682; H04J 3/0673; H04Q 11/0067
USPC ................................ 375/371, 373, 362, 354
See application file for complete search history.

(56) References Cited

U.S. PATENT DOCUMENTS

| 7,333,508 | B2 | 2/2008 | Rabie et al. |
| 7,406,088 | B2 | 7/2008 | Magd et al. |
| 7,417,995 | B2 | 8/2008 | Rabie et al. |
| 7,505,466 | B2 | 3/2009 | Rabie et al. |
| 7,565,436 | B2 | 7/2009 | Rabie et al. |
| 8,018,841 | B2 | 9/2011 | Holness et al. |
| 8,149,692 | B2 | 4/2012 | Holness et al. |
| 8,305,938 | B2 | 11/2012 | Holness et al. |
| 8,687,633 | B2 | 4/2014 | Rabie et al. |
| 9,401,817 | B2 | 7/2016 | Holness et al. |
| 10,256,909 | B2 | 4/2019 | Gareau et al. |
| 10,313,103 | B1 | 6/2019 | Perras et al. |
| 10,396,972 | B1 | 8/2019 | Gareau et al. |
| 10,863,386 | B1 * | 12/2020 | Anand ................. H04J 3/0638 |
| 2005/0141509 | A1 | 6/2005 | Rabie et al. |
| 2009/0297164 | A1 * | 12/2009 | Horiuchi ............... H04J 3/0682 398/154 |
| 2010/0040369 | A1 * | 2/2010 | Zhao .................... H04J 3/0673 398/58 |

(Continued)

FOREIGN PATENT DOCUMENTS

EP 1712035 A1 10/2006
EP 2430798 B1 3/2012

(Continued)

*Primary Examiner* — Phuong Phu
(74) *Attorney, Agent, or Firm* — Clements Bernard Baratta; Lawrence A. Baratta, Jr.; Christopher L. Bernard

(57) ABSTRACT

A node can include a clock; and mapper circuitry configured to determine a timestamp from the clock, and transmit the timestamp to a second node in a Radio over Ethernet (RoE) frame with the timestamp in a control subtype and with an operational code (opcode) that designates the timestamp is in the frame. The node can also include a demapper circuit configured to receive a second timestamp from the second node in a second RoE frame, and provide the second timestamp to a Differential Clock Recovery (DCR) circuit for adjustment of the clock to a second clock at the second node.

20 Claims, 11 Drawing Sheets

(56) References Cited

U.S. PATENT DOCUMENTS

| | | | |
|---|---|---|---|
| 2012/0089684 A1* | 4/2012 | Angus | H04L 47/22 709/206 |
| 2013/0089328 A1* | 4/2013 | Davis | H04Q 11/0067 398/58 |
| 2017/0214516 A1 | 7/2017 | Rivaud et al. | |
| 2019/0097744 A1 | 3/2019 | Abdullah et al. | |
| 2019/0141056 A1 | 5/2019 | Estabrooks et al. | |
| 2020/0028585 A1 | 1/2020 | Abdullah et al. | |
| 2020/0205231 A1* | 6/2020 | Trojer | H04W 24/02 |
| 2021/0242981 A1* | 8/2021 | Seki | H04L 5/0003 |

FOREIGN PATENT DOCUMENTS

| | | | |
|---|---|---|---|
| EP | 2460320 A4 | 6/2013 | |
| EP | 2996270 A1 | 3/2016 | |
| EP | 2417735 B1 | 6/2017 | |
| WO | 2020112260 A1 | 6/2020 | |

\* cited by examiner

CARRYING A TIMESTAMP IN RADIO OVER ETHERNET

FIELD OF THE DISCLOSURE

The present disclosure generally relates to networking. More particularly, the present disclosure relates to systems and methods for Differential Clock Recovery (DCR) using a global reference time in a wireless fronthaul system that includes packet links and for systems and methods for carrying a timestamp in Radio over Ethernet (RoE).

BACKGROUND OF THE DISCLOSURE

Conventional DCR implementations use a physical clock that is syntonized on each node (typically via Synchronous Ethernet (SyncE)) as a common reference. That is, to syntonize two nodes is to adjust the two nodes to operate on the same frequency. The frequency of a client clock is measured relative to this common reference at a receiving node and these measurements are used to synthesize the client clock at a transmitting node. SyncE is described, for example, in ITU-T Rec. G.8261/Y.1361 (08/19), ITU-T Rec. G.8262/Y.1362 (11/18), and ITU-T Rec. G.8264/Y.1364 (08/17), the contents of each is incorporated by reference in their entirety.

The physical layer clock (i.e., SyncE using Ethernet interfaces) to syntonize two connected nodes. That is, node B recovers the physical layer Ethernet clock it receives from node A and uses it to syntonize its local clock. The node B can recover the frequency of the clock. However, because the propagation delay between nodes is unknown the phase of the node A clock cannot be recovered. Thus, clocks on node A and node B can be syntonized, but the clocks can have an unknown phase offset. Since this clock is not phase aligned on each node, this provides a mechanism to recover the frequency of a client signal at the destination, but not the phase.

Further, wireless fronthaul applications are moving towards use of packet connectivity between a radio (e.g., a Remote Radio Head (RRH)) and a Baseband Unit (BBU), namely Common Public Radio Interface (CPRI) over packet. From application level, it requires the phase to be synchronized as well and precise delay control can be measured and mitigated.

Also, the IEEE 1914.3 (2018) Standard for Radio over Ethernet Encapsulations and Mappings, the contents of which are incorporated by reference in their entirety, specifies an 'orderInfo' field which is used to indicate the proper sequence of packets. Radio over Ethernet (RoE) is defined as a native encapsulation header format for transmitting time-sensitive radio data and control data streams. RoE supports timestamping or sequence numbering to enable time synchronization of RoE packets and time alignment of streams. The 'orderInfo' field in the RoE header optionally supports a timestamp format, but generally uses a sequence number format.

Disadvantageously, operating within compliance of IEEE 1914.3-2008 has significant limitations for carrying timestamp information. That is, the designated field is typically used for a sequence format. There is a need to support carrying a timestamp in other manners using RoE.

BRIEF SUMMARY OF THE DISCLOSURE

In an embodiment, the present disclosure relates to systems and methods for Differential Clock Recovery (DCR) using a global reference time in a wireless fronthaul system that includes CPRI over packet links. Specifically, the present disclosure utilizes a Global Reference Time to perform a Differential Clock Recovery (DCR) to allow a constant time delay of a client signal through a packet network and to preserve the phase of a client signal through the packet network. This also allows bidirectional paths through the packet network to have symmetric delays. That is, the present disclosure enables both frequency and phase synchronization across bidirectional paths. An example use case can include wireless fronthaul between RRH and BBU where the CPRI (or equivalent) links are carried in part over a packet network.

In another embodiment, the present disclosure relates to systems and methods for carrying a timestamp in Radio over Ethernet (RoE). The timestamp can be carried separate from the 'orderInfo' field which can be used for carrying a sequence number. In an embodiment, the present disclosure utilizes a subtype of a control packet and a specific operational code (opcode) such as Vendor Specific Data (VSD) to carry the timestamp as an example. It can also define a new opcode from control packet subtype by requesting ROE standard to re-purpose one of reserved opcode for this purpose. Also, the present disclosure includes a definition of the payload for the timestamp, and a flag to note if the timestamp is for frequency only or also a phase-aligned Time of Day (ToD) timestamp. Advantageously, this approach provides an efficient approach to carry timestamps on all RoE data types while maintaining compliance with the RoE standard, IEEE 1914.3-2008.

In an embodiment, an egress node includes circuitry configured to synchronize with a global reference time, receive a signal including a presentation time for when a specific part of the signal is to be transmitted, wherein the presentation time was determined by an ingress node with reference to the global reference time, determine an actual transmission time when the specific part of the signal is transmitted, and cause adjustment of a clock based on a time error derived from a difference between the presentation time and the actual transmission time. The egress node can be connected to the ingress node over a packet network, wherein the signal can include a wireless signal, and wherein the presentation time can be when the egress node should transmit the specific part. The adjustment can be configured to preserve a clock phase of the signal at the egress node. The adjustment can be configured to either speed up or slow down the clock to minimize the time error. The presentation time can be determined, at the ingress node, by adding a constant time delay to a reception time of the specific part. The signal can be a Radio over Ethernet (RoE) packet stream encapsulating a Common Public Radio Interface (CPRI) signal. The presentation time can be in an orderInfo field in a RoE header.

In another embodiment, an ingress node includes circuitry configured to synchronize with a global reference time, receive a signal for transmission to the egress node and detect a reference therein with respect to the global reference time, determine a presentation time for when the reference in the signal is to be transmitted from the egress node, and transmit the signal to the egress node with the presentation time included therein for the egress node to adjust its clock based on a time error derived from a difference between the presentation time and an actual transmission time. The ingress node can be connected to the egress node over a packet network, wherein the signal can include a wireless signal, and wherein the presentation time can be when the egress node should transmit the reference. The reference can include any of a specific location in the client signal, payload, a Start of Frame, an Alignment Marker, and a specific location in a header. The presentation time can be determined by adding a constant time delay to a reception time of the specific part. The transmitted signal can be a Radio over Ethernet (RoE) packet stream encapsulating a Common Public Radio Interface (CPRI) signal. The presentation time can be in an orderInfo field in a RoE header.

In a further embodiment, a method includes, at an egress node, synchronizing with a global reference time; receiving a signal including a presentation time for when a specific part of the signal is to be transmitted, wherein the presentation time was determined by an ingress node with reference to the global reference time; determining an actual transmission time when the specific part of the signal is transmitted; and causing adjustment of a clock based on a time error derived from a difference between the presentation time and the actual transmission time. The method can further include, at the ingress node, synchronizing with the global reference time; receiving a client signal for transmission to the egress node and determining a reference therein with respect to the global reference time, wherein the reference is the specific part of the signal; determining the presentation time for when the reference in the client signal is to be transmitted at the egress node, and transmitting the client signal to the egress node with the presentation time included therein. The egress node can be connected to the ingress node over a packet network, wherein the signal can include a wireless signal, and wherein the presentation time can be when the egress node should transmit the specific part. The adjustment can be configured to preserve a clock phase of the client signal at the egress node. The adjustment can be configured to either speed up or slow down the clock to minimize the time error. The presentation time can be determined by adding a constant time delay to a reception time of the specific part. The signal can be a Radio over Ethernet (RoE) packet stream encapsulating a Common Public Radio Interface (CPRI) signal.

In yet another embodiment, a node includes a clock; and mapper circuitry configured to generate a timestamp from the clock, and transmit the timestamp to a peer node in a Radio over Ethernet (RoE) frame with the timestamp in a control subtype of the RoE frame and with an operational code (opcode) that designates the timestamp is in the frame. The node can further include a demapper circuit configured to receive a second timestamp from the peer node in a second RoE frame with the second timestamp in a control subtype of the second RoE frame and with an operational code (opcode) that designates the second timestamp is in the frame, and provide the received second timestamp to a Differential Clock Recovery (DCR) circuit for adjustment of the clock. The opcode can designate Vendor Specific Data (VSD) from the control subtype. The opcode can be one of a code from a reserved or undefined opcodes from the control subtype. The mapper circuitry can be further configured to include a flag in the control subtype to determine whether the timestamp is frequency only or a phase aligned timestamp. The control subtype can include an integer and a fractional value for the timestamp. The mapper circuitry can be further configured to include a sequence number in an orderInfo field of the control subtype in the RoE frame in addition to the timestamp in the control subtype.

In yet another embodiment, a node includes a clock; and a demapper circuit configured to receive a timestamp from a peer node in a Radio over Ethernet (RoE) frame with the timestamp in a control subtype of the RoE frame and with an operational code (opcode) that designates the timestamp is in the frame, and provide the timestamp to a Differential Clock Recovery (DCR) circuit for adjustment of the clock. The node can further include mapper circuitry configured to generate a second timestamp from the clock, and transmit the second timestamp embedded in the control subtype of a second RoE frame to the peer node. The opcode can designate Vendor Specific Data (VSD) from the control subtype. The opcode can be one of a code from a reserved or undefined opcodes from the control subtype. The demapper circuitry can be further configured to receive a flag in the control subtype to determine whether the timestamp is frequency only or a phase aligned timestamp. The control subtype can include an integer and a fractional value for the timestamp. The demapper circuitry can be further configured to receive a sequence number in an orderInfo field in the RoE frame in addition to the timestamp in the control subtype.

In yet another further embodiment, a method includes generating a timestamp from a clock; and transmitting the timestamp to a peer node in a Radio over Ethernet (RoE) frame with the timestamp in a control subtype of the RoE frame and with an operational code (opcode) that designates the timestamp is in the RoE frame. The method can further include receiving a second timestamp from the peer node in a second RoE frame with the second timestamp in an control subtype of the second RoE frame and with an operational code (opcode) that designates the received second timestamp is in the received second RoE frame, and provide the received second timestamp to a Differential Clock Recovery (DCR) circuit for adjustment of the clock. The opcode can designate Vendor Specific Data (VSD) from the control subtype. The opcode can be one of a code from a reserved or undefined opcodes from the control subtype. The method can further include including a flag in the control subtype to determine whether the timestamp is frequency only or a phase aligned timestamp. The method can further include including a sequence number in an orderInfo field of the control subtype in the RoE frame in addition to the timestamp in the control subtype.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
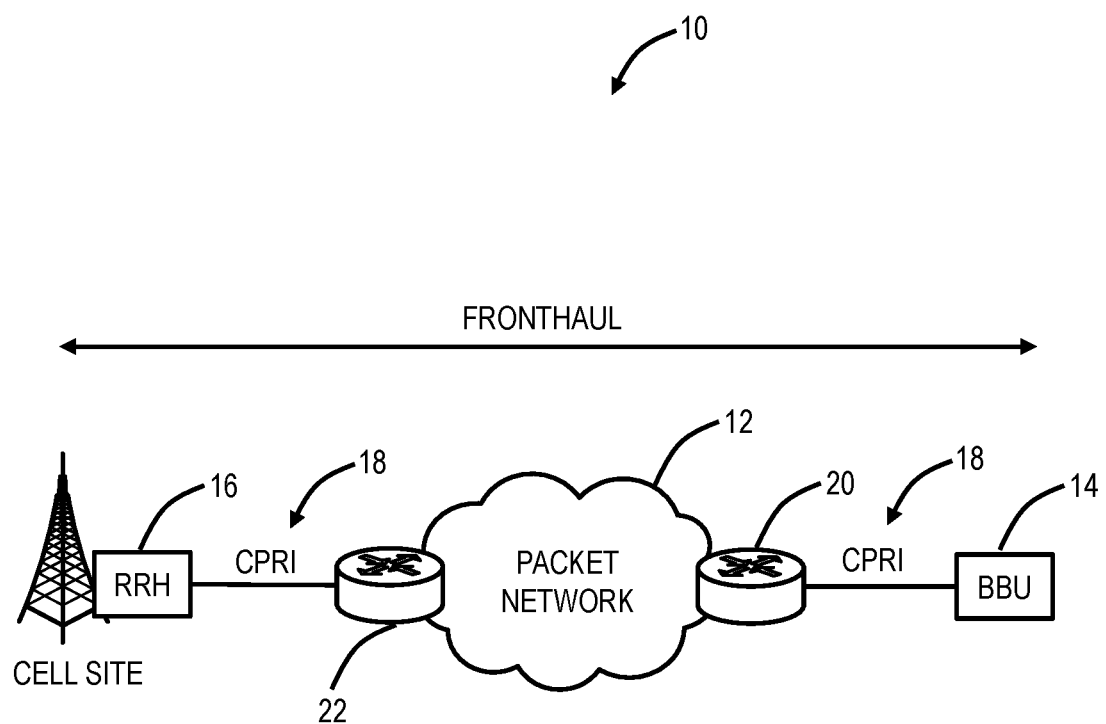
FIG. 1 is a network diagram of a network illustrating wireless fronthaul over a packet network.

Again, in an embodiment, the present disclosure relates to systems and methods for Differential Clock Recovery (DCR) using a global reference time in a wireless fronthaul system that includes packet links. Specifically, the present disclosure utilizes a Global Reference Time to perform a Differential Clock Recovery (DCR) to allow a constant time delay of a client signal through a packet network and to preserve the phase of a client signal through the packet network. This may also be used for regenerating a Time Division Multiplexing (TDM) signal after timing is lost through a packet network. This also allows bidirectional paths through the packet network to have symmetric delays. That is, the present disclosure enables both frequency and phase synchronization across bidirectional paths. An example use case can include wireless fronthaul between RRH and BBU where the CPRI (or equivalent) links are carried in part over a packet network.

Again, in another embodiment, the present disclosure relates to systems and methods for carrying a timestamp in Radio over Ethernet (RoE). The timestamp can be carried separate from the 'orderInfo' field which can be used for carrying a sequence number. In an embodiment, the present disclosure utilizes a subtype of a control packet and a specific operational code (opcode) such as Vendor Specific Data (VSD) to carry the timestamp as an example. It can also define a new opcode from control packet subtype by requesting ROE standard to re-purpose one of reserved opcode for this purpose Also, the present disclosure includes a definition of the payload for the timestamp, and a flag to note if the timestamp is for frequency only or also a phase-aligned Time of Day (ToD) timestamp. Advantageously, this approach provides an efficient approach to carry timestamps on all RoE data types while maintaining compliance with the RoE standard, IEEE 1914.3-2008.

Wireless Fronthaul

As mobile networks evolve from a 4G centralized architecture to a 5G disaggregated and distributed network architecture, the 3GPP Radio Access Network (RAN) will need to converge. The 4G RAN makes use of predominantly a CPRI transport technology that is vendor proprietary, and, as such, comes at a high cost. To address the cost of higher capacity and higher density radio deployments in a 5G RAN, mobile economics necessitates a more cost efficient fronthaul solution. This RAN convergence will have the 4G RAN evolve from a CPRI fronthaul between the Radio Equipment (RE) and Radio Equipment Controller (REC) to an Ethernet packet transport, that can address the higher capacity and higher density at the economic curve of Ethernet technology.

There are different techniques to interconnect 4G RAN CPRI REs to RECs, all with various advantages and challenges. One approach is to use Ethernet transport technology, that is being pursued by the mobile industry and their standards bodies to establish a foundation that is economically viable. One such standard is IEEE 1914.3, RoE, that defines standards to emulate the CPRI links over Ethernet. This requires accurate synchronization of both endpoints of the RoE emulation on the RE and REC, i.e., between a BBU 14 and an RRH 16.

RoE defines the encapsulation and mapper, and decapsulation and demapper for a CPRI RE for transport over an Ethernet packet transport network. In one direction, RE data (including I/Q data, control and management, and synchronization information) is transported using a CPRI frame structure mapped and encapsulated into an Ethernet frame. In the opposite direction, the Ethernet frame is demapped and the original CPRI frame is recovered from the RoE emulation. Due to the low latency and strict time synchronization requirement specified by CPRI, the demapper has to recover the clock and match the clock from the Ethernet-to-CPRI direction. Failure to recover an accurate frequency and/or phase clock may result in packet loss and Packet Delay Variation (PDV) (overrun and underrun conditions). Differential Clock Recovery (DCR) is one technique to recover the clock. In order to use DCR, the timestamp is applied on the encapsulation (CPRI-to-Ethernet) direction and is relayed over the transport network. This timestamp is then used by DCR algorithm on the Ethernet-to-CPRI direction to recover the requisite CPRI transmit clocks.

FIG. 1 is a network diagram of a network 10 illustrating wireless fronthaul over a packet network 12. The wireless fronthaul is presented as an example use case for the DCR presented herein. Wireless fronthaul includes the connectivity in a Radio Access Network (RAN) between a BBU 14 and an RRH 16. Fronthaul started when Long Term Evolution (LTE) networks moved the radios closer to the antennas and included a fiber link operating CPRI 18. The BBU 14 and the RRH 16 can be kilometers to tens of kilometers apart. The fiber link operating CPRI 18 can utilize CPRI rates of 2.458 Gbps, 3.072 Gbps, 4.915 Gbps, 6.144 Gbps, 9.830 Gbps, and beyond. The initial wireless fronthaul applications relied on direct optical CPRI connections between the BBU 14 and the RRH 16. However, operators are extending their deployments including the packet network 12 with routers/switches 20, 22 interfacing CPRI. Those skilled in the art will understand the routers/switches 20, 22 can be generally referred to as nodes 20, 22, network elements 20, 22, etc. The node 20 can connect to the BBU 14 via the CPRI 18 link and the node 22 can connect to the RRH 16 via the CPRI 18 link as well, with the nodes 20, 22 connected to one another via the packet network 12. Also, while FIG. 1 illustrates the packet network 12 between the BBU 14 and the RRH 16, other types of networks are also possible such as Optical Transport Network (OTN), Synchronous Optical Network (SONET), and the like, as well as multi-layer networks (e.g., packet over OTN), though the clock synchronization will be different from one to another type of networks For example, in SONET, the clock is synchronized at each hop therefore no DCR is needed. For example, with emulation of SONET, then the DCR can be adopted.

The RRH 16 may include the RE having RF circuitry, such as converters, filters, oscillators, amplifiers, modulators, etc. These components allow the RRH to covert optical signals to electrical signals, and vice versa. This may be particularly useful in CPRI. Other features of the RRH 103 may include receiving/transmitting a desired band of signals from/to antennas, amplifying signals to desired power levels, filtering signals, converting signals, or other related actions. The BBU 14 may be a unit that processes baseband at call sites for telecommunications systems. Baseband may refer a signal that has a very narrow and near-zero frequency range, e.g., low-pass or non-modulated signal. The BBU 14 may include, among other things, the REC which is responsible for communication through the physical interface.

CPRI defines three logical links for: (1) I/Q data; (2) timing data; and, (3) control and management data. RoE defines techniques for emulating each of these logical links, and further defines additional emulation techniques for the I/Q data. The emulation technique being used is explicitly indicated in the RoE common header of each RoE packet. In an embodiment, the emulation technique that the present disclosure applies to is Structure Agnostic Tunneling Mode (SA-TM). This emulation approach, unlike the other approaches, does not make use of a timestamp to synchronize the playout of the CPRI data, but rather requires that the RoE devices at each end of the emulated circuit be frequency and phase synchronized before the RoE transport can commence. Instead, 1914.3-2008 specifies the use of a sequence number. However, when no local synchronization is possible at the RE, most likely or even at the REC, less likely, a packet clock recovery technique using the RoE emulated service is needed. It is important to note that the CPRI clock frequency and phase alignment may or may not align with that of the transport network. As such, it is not sufficient to distribute a transport network's clocks for use by CPRI. The present disclosure includes techniques to enable the use of the RoE standard to extend the specification to enable CPRI clock distribution and recovery for the purpose of enabling CPRI synchronization across the packet network 12.

Also, as noted in the background described herein, it is not possible using SyncE to ensure the same phase at the nodes 20, 22. As such, the present disclosure includes an approach for differentially encoding a client service clock relative to a Global Reference Time. That is, a client signal which is clocked at a frequency unrelated to the Global Reference Time is packetized and asynchronously transported through the packet network 12. The client signal is regenerated with constant time delay to preserve phase at the destination.

The foregoing descriptions describe one direction in terms of differentially encoding a client service clock relative to a Global Reference Time. Of course, those skilled in the art will recognize a practical embodiment of any client connection in a network is bidirectional, and the approach described herein can be performed in both directions along with coordination between each direction for a symmetric time delay.

Process for Clock Recovery

Figure 2:
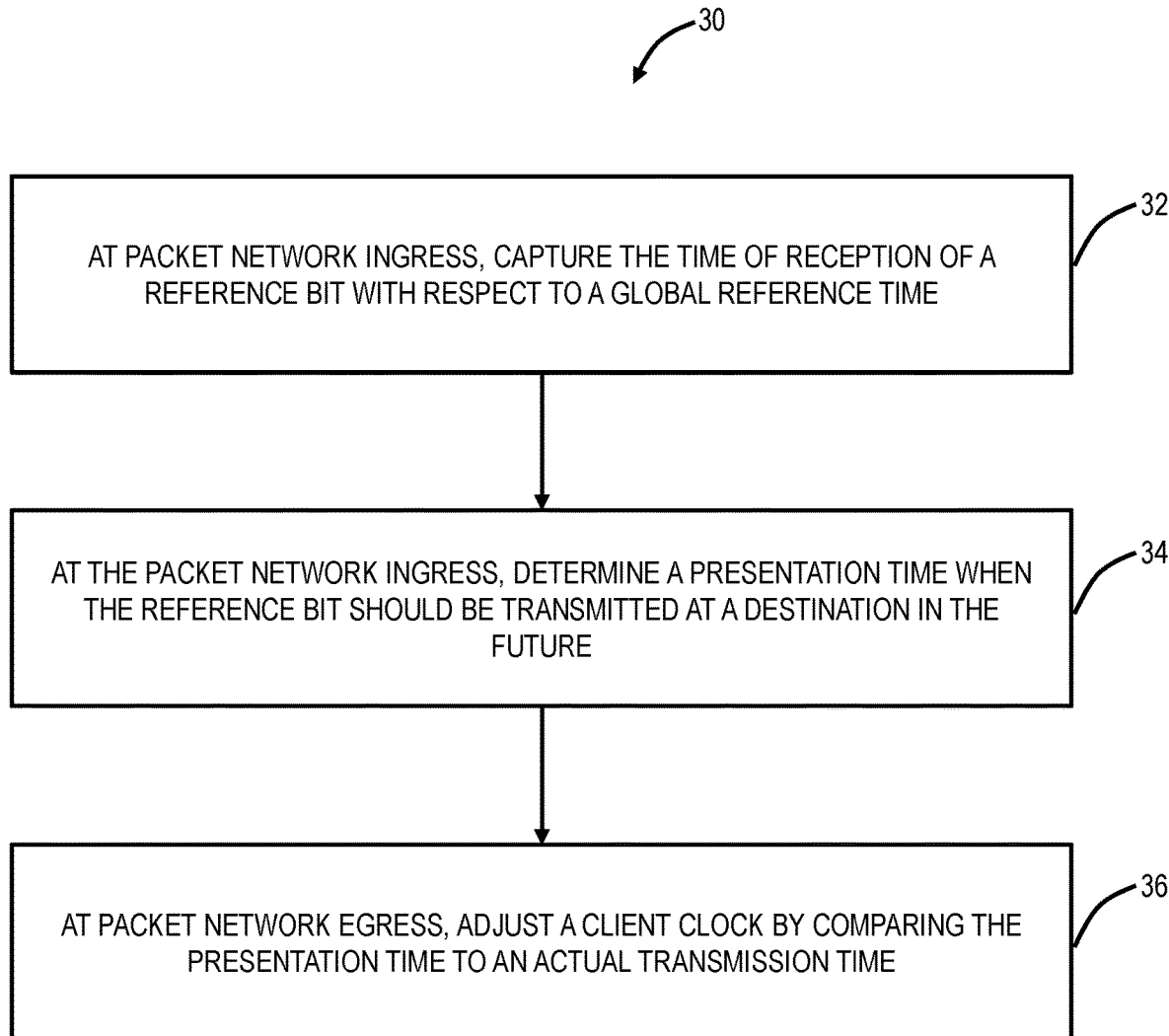
FIG. 2 is a flowchart of a process for differential clock recovery.

FIG. 2 is a flowchart of a process 30 for differential clock recovery. The process 30 is described with reference from transmission from the node 20 to the node 22, i.e., from right-to-left in the network 10 in FIG. 1. In this context, the node 20 is referred to as network ingress and the node 22 is referred to as network egress. These nodes are referred to as packet network ingress and packet network egress. However, this can be generalized to network ingress and network egress nodes where the intermediate network is another type of network, e.g., OTN, etc. Also, the process 30 could equally be performed in the opposite direction, with the node 20 as the network egress and the node 22 as the network ingress. This process 30 of differential clock recovery requires that the nodes 20, 22 have a synchronized reference time. Accordingly, the process 30 further includes synchronizing a global reference time between the nodes 20, 22, such as via Precision Time Protocol (PTP) (IEEE 1588), a Global Navigation Satellite System (GNSS), etc.

The process 30 includes, at the packet network ingress, capturing a time of reception of a reference bit (or bits) with respect to the global reference time (step 32). This step is about setting a start time based on a reference in an incoming signal to the packet network 12. The signal reference bits may be at a particular location within a packet payload. Alternatively, the signal reference bits may be a Start of Frame (SOF), Start of Packet (SOP), an Alignment Marker, or any other feature of the client signal that can be recognized by the receiving node. That is, anything agreed to in advance by both the ingress and egress nodes (e.g., the nodes 20, 22) for determining a specific bit time instance.

The process 30 further includes, at the packet network ingress, determining a presentation time when the reference bit (or bits) should be transmitted at the destination in the future (step 34). The presentation time is a future time that is used to specify when the bits, e.g., BBU symbols are to be transmitted onto the CPRI link to a radio, i.e., the RRH. The presentation time can be referenced to the reference bit (or bits) or to another unique marker. Further, the presentation time can be included in a packet header.

In an embodiment, the process 30 can use the 'orderInfo' field in the RoE header. The timestamp format may represent a presentation time used to specify the time at which the BBU symbols are to be transmitted onto a CPRI link to a radio. The timestamp format of the orderInfo field has 24 bits of 1 ns resolution and 5 bits for 0.03125 ns resolution. Similarly, it can be used to ensure that the link delay from the radio to the BBU is equal to the reverse direction. For example, the BBU sending CPRI assumes symmetric delay on its link to the RRH and uses a measured round-trip-delay divided by two to assess the delay to the RRH. Of course, the underlying assumption of CPRI is a direct fiber connection from BBU to RRH. In an embodiment, the presentation time, determined at step 34, is included in the RoE header, such as in the orderInfo field. In another embodiment, the process 30 can use the various techniques described herein for carrying a timestamp in RoE, The presentation time is determined by the packet network ingress by adding a constant time delay to the reception time of the reference bit (or bits). The expectation is that there is an automatic or manual service activation test run on the path (or paths if there is an alternate protection path provisioned) to characterize the packet latency and packet latency variation through the packet network. The objective is to know the worst case and best-case network packet delay via a statistical sampling of actual delays. The goal then is to set a minimum delay offset (where presentation time=reference bit receive time+the constant delay offset) which will be sufficient to avoid buffer underruns or overruns.

The process 30 further includes, at a packet network egress, after receiving the reference bit (or bits) and the presentation time, adjusting a client clock, at the packet network egress, by comparing the presentation time to an actual transmission time. That is, the client clock can be regenerated and adjusted by comparing the presentation time determined by the packet network ingress to the actual transmission time of the client signal reference bits. The difference of the desired transmission time determined by the packet network ingress and the actual transmission time at the packet network egress can be fed into a control circuit, as a time error, which speeds up or slows down the client clock so that the error is minimized. In this manner, the time delay through the packet network 12 can be consistent/deterministic.

By sending the presentation time along with a corresponding reference bit, the time error can be determined by noting the difference between the current Global Reference Time when the reference bit is transmitted at the destination, and the desired presentation time. Phase and frequency adjustments are made to the transmit clock to minimize this time error. Minimizing this time error ensures that a constant time delay is met, and that the frequency and phase of the transmit clock at the destination will match that of the recovered clock at the source. Since the Global Reference Time is phase aligned on each node, it is now possible to preserve the phase of the client signal through the packet network 12.

The process 30 leverages the concept of presentation time to also transparently transport the clock associated with the RoE encapsulated CPRI signal. This technique could also be applied to circuit emulation of any type of Time Division Multiplexing (TDM) signal, such as SONET or OTN.

Example Hardware Configuration

Figure 3:
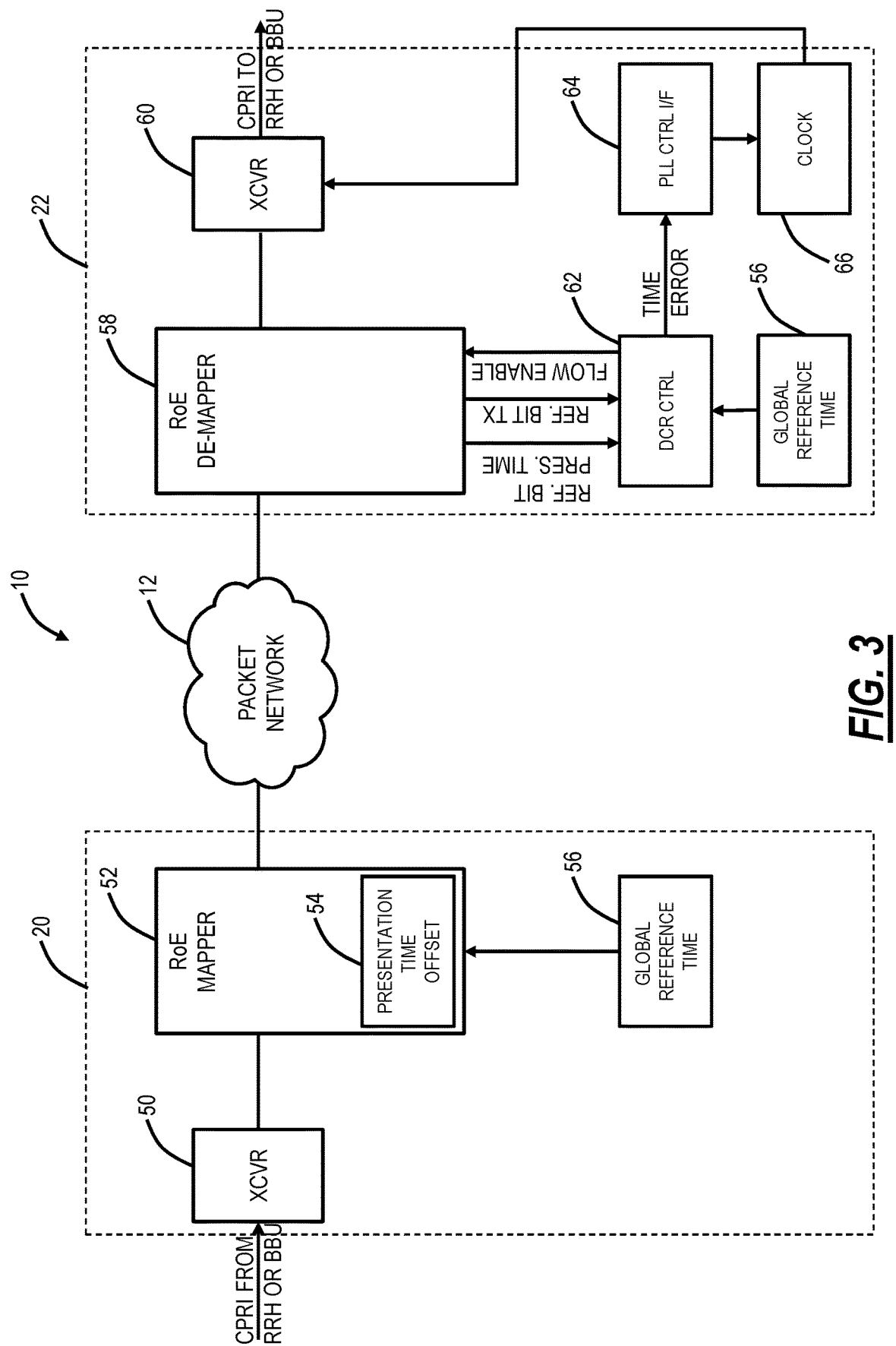
FIG. 3 is a network diagram of a portion of the network of FIG. 1 illustrating components at the nodes that are connected by the packet network for implementing the process of FIG. 2.

FIG. 3 is a network diagram of a portion of the network 10 illustrating components at the nodes 20, 22 that are connected by the packet network 12 for implementing the process 30. FIG. 3 illustrates the signal flow either from the BBU 14 to the RRH 16 or from the RRH 16 to the BBH 14. FIG. 3 illustrates the components at the nodes 20, 22, and excludes the CPRI 18 links, the BBU 14, and the RRH 16, see FIG. 1. For illustration purposes, FIG. 3 is described from the BBU 14 to the RRH 16.

At the node 20, the BBU 14 is connected to a transceiver 50 that terminates the CPRI 18 link. The transceiver 50 can be an optical device, such as a pluggable optical module. The transceiver 50 connects to a RoE mapper 52. The RoE mapper 52 is configured to packetize client signals from the CPRI 18 link. The RoE mapper 52 can be the packet network ingress in the process 30 for the purposes of implementing the steps 32, 34. The RoE mapper 52 is configured to provide the presentation time using a global reference time 56 and a presentation time offset 54 based on detection of the reference bit (or bits). The RoE mapper 52 is configured to send RoE packets over the packet network 12 including an RoE header with the presentation time.

At the node 22, the packet network 12 connects to a RoE demapper 58. The RoE demapper 58 is configured to provide the opposite functionality as the RoE mapper 52, namely to receive RoE packets and provide the corresponding client signals to a transceiver 60 that connects to the RRH 16 over the CPRI 18 link.

The RoE demapper 58 includes DCR control functionality 62 which can be implemented in hardware, software, firmware, and/or a combination thereof. The DCR control functionality 62 is configured to implement the step 36 with the global reference time 56 to determine a time error that is provided to a Phase Lock Loop (PLL) control interface 64 that can adjust (speed up/slow down) a clock 66. The connections between the RoE demapper 58 and the DCR control functionality 62 include a reference bit presentation time, a reference bit transmitted (Tx), and a flow enable. The flow enable is asserted when the global reference time matches the reference bit presentation time of the packet at the head of a demapper queue. The reference bit Tx is asserted when a reference bit is transmitted to the transceiver 60. The reference bit presentation time is the value of the presentation time from the packet at the head of the demapper queue.

Figure 4:
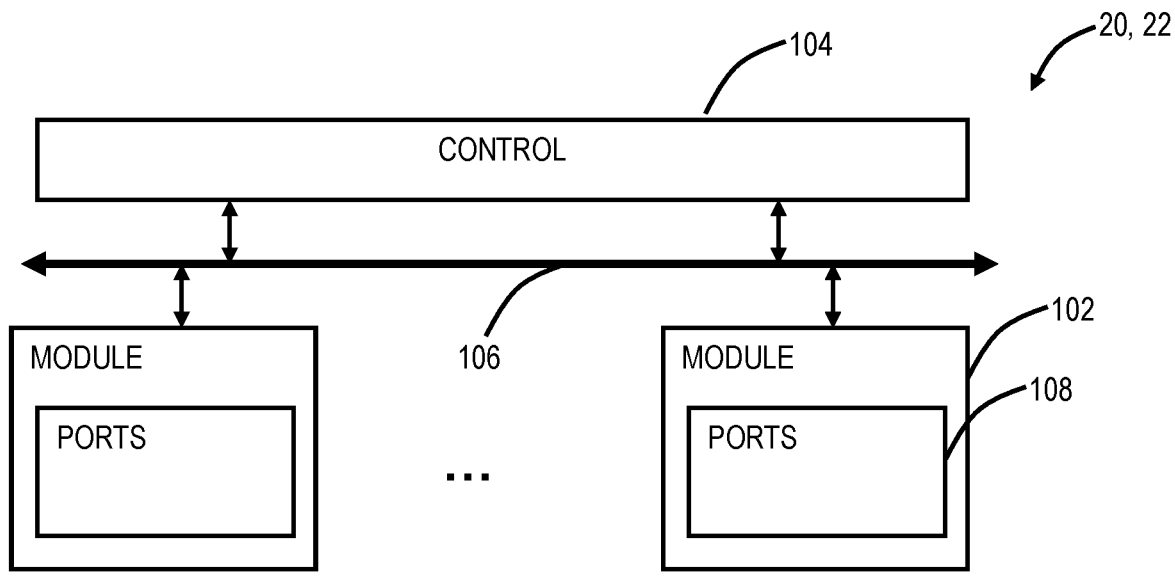
FIG. 4 is a block diagram of an example implementation of a node.

The various components in the nodes 20, 22 can be realized in hardware modules, such as described in FIG. 4 with reference to an example implementation of the node 20, 22.

Example Node

FIG. 4 is a block diagram of an example implementation of a node 20, 22. Those of ordinary skill in the art will recognize FIG. 4 is a functional diagram in an oversimplified manner, and a practical embodiment may include additional components and suitably configured processing logic to support known or conventional operating features that are not described in detail herein.

In an embodiment, the node 20, 22 is a packet switch, but those of ordinary skill in the art will recognize the systems and methods described herein can operate with other types of network elements and other implementations that support packet or TDM networking. In this embodiment, the node 20, 22 includes a plurality of modules 102, 104 interconnected via an interface 106. The modules 102, 104 are also known as blades, line cards, line modules, circuit packs, pluggable modules, etc., and generally refer to components mounted on a chassis, shelf, rack-mounted unit, pizza box, etc. of a data switching device, i.e., the node 20, 22. Each of the modules 102, 104 can include numerous electronic devices and/or optical devices, including pluggable optical modules, mounted on a circuit board along with various interconnects, including interfaces to the chassis, shelf, etc.

Two example modules are illustrated with line modules 102 and a control module 104. The line modules 102 include ports 108, such as a plurality of Ethernet ports, CPRI ports, etc. For example, the line module 102 can include a plurality of physical ports disposed on an exterior of the module 102 for receiving ingress/egress connections. Additionally, the line modules 102 can include switching components to form a switching fabric via the interface 106 between all of the ports 108, allowing data traffic to be switched/forwarded between the ports 108 on the various line modules 102. The switching fabric is a combination of hardware, software, firmware, etc. that moves data coming into the node 20 out by the correct port 108 to the next node 22. "Switching fabric" includes switching units in a node; integrated circuits contained in the switching units; and programming that allows switching paths to be controlled. Note, the switching fabric can be distributed on the modules 102, 104, in a separate module (not shown), integrated on the line module 102, or a combination thereof.

The control module 104 can include a microprocessor, memory, software, and a network interface. Specifically, the microprocessor, the memory, and the software can collectively control, configure, provision, monitor, etc. the node 20, 22. The network interface may be utilized to communicate with an element manager, a network management system, etc. Additionally, the control module 104 can include a database that tracks and maintains provisioning, configuration, operational data, and the like.

Again, those of ordinary skill in the art will recognize the node 20, 22 can include other components which are omitted for illustration purposes, and that the systems and methods described herein are contemplated for use with a plurality of different network elements with the node 20, 22 presented as an example type of network element. For example, in another embodiment, the node 20, 22 may include corresponding functionality in a distributed fashion. In a further embodiment, the chassis and modules may be a single integrated unit, namely a rack-mounted shelf where the functionality of the modules 102, 104 is built-in, i.e., a "pizza-box" configuration. That is, FIG. 4 is meant to provide a functional view, and those of ordinary skill in the art will recognize actual hardware implementations may vary.

Example Controller

Figure 5:
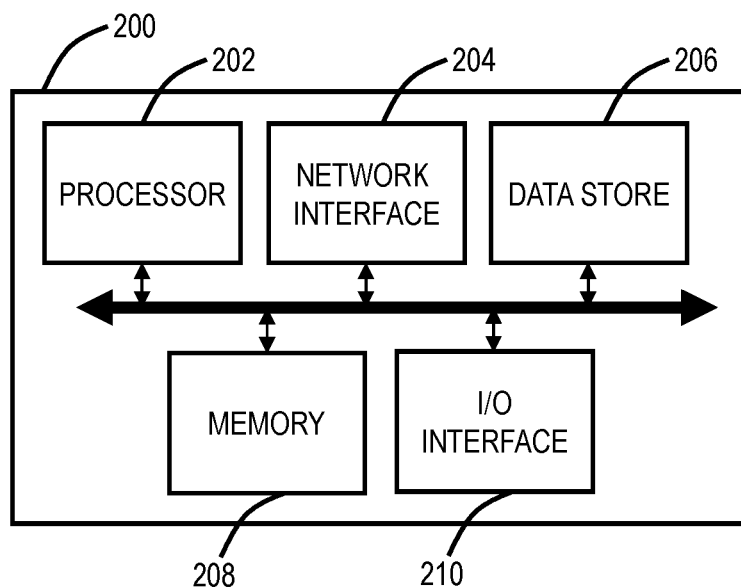
FIG. 5 is a block diagram of an example controller, which can form a control module for the node of FIG. 4.

FIG. 5 is a block diagram of an example controller 200, which can form a control module 104 for the node. The controller 200 can be part of the node 200, or a stand-alone device communicatively coupled to the node 200. Also, the controller 200 can be referred to in implementations as a control module, a shelf controller, a shelf processor, a system controller, etc. The controller 200 can include a processor 202 which is a hardware device for executing software instructions. The processor 202 can be any custom made or commercially available processor, a central processing unit (CPU), an auxiliary processor among several processors associated with the controller 200, a semiconductor-based microprocessor (in the form of a microchip or chipset), or generally any device for executing software instructions. When the controller 200 is in operation, the processor 202 is configured to execute software stored within the memory, to communicate data to and from the memory, and to generally control operations of the controller 200 pursuant to the software instructions. The controller 200 can also include a network interface 204, a data store 206, memory 208, an I/O interface 210, and the like, all of which are communicatively coupled to one another and to the processor 202.

The network interface 204 can be used to enable the controller 200 to communicate on a data communication network, such as to communicate to a management system, to the nodes 12, 100, and the like. The network interface 204 can include, for example, an Ethernet module. The network interface 204 can include address, control, and/or data connections to enable appropriate communications on the network. The data store 206 can be used to store data, such as control plane information, provisioning data, Operations, Administration, Maintenance, and Provisioning (OAM&P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the controller 200 to communicate with other devices.

Process

Figure 6:
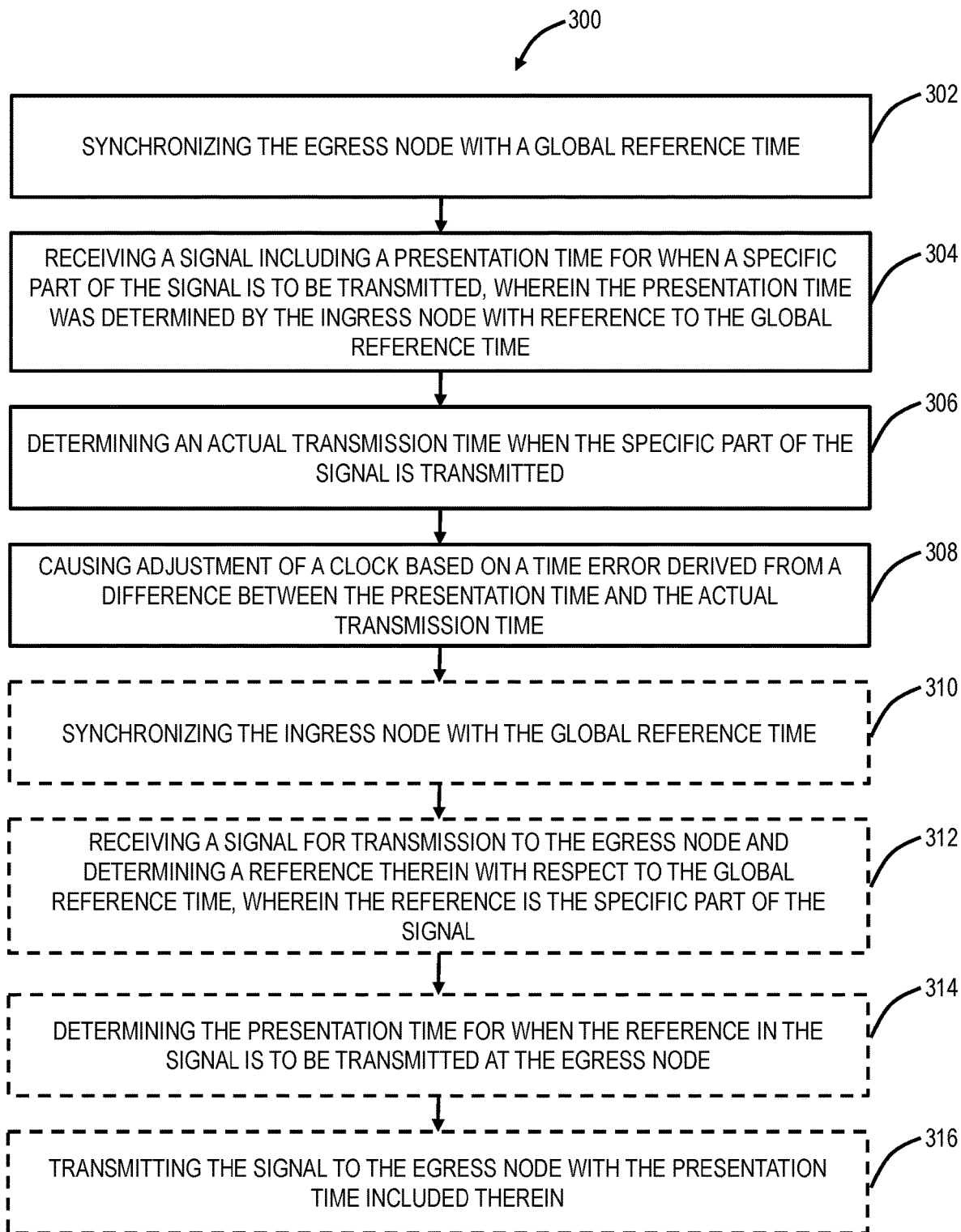
FIG. 6 is a flowchart of a process for Differential Clock Recovery (DCR) using a global reference time.

FIG. 6 is a flowchart of a process 300 for Differential Clock Recovery (DCR) using a global reference time. The process 300 includes, at an egress node, synchronizing with a global reference time (step 302); receiving a signal including a presentation time for when a specific part of the signal is to be transmitted, wherein the presentation time was determined by the ingress node with reference to the global reference time (step 304); determining an actual transmission time when the specific part of the signal is transmitted (step 306); and causing adjustment of a clock based on a time error derived from a difference between the presentation time and the actual transmission time (step 308).

The process 300 can further include, at the ingress node, synchronizing the global reference time (step 310); receiving a signal for transmission to the egress node and determining a reference therein with respect to the global reference time, wherein the reference is the specific part of the signal (step 312); determining the presentation time for when the reference in the signal is to be transmitted at the egress node (step 314); and transmitting the signal to the egress node with the presentation time included therein (step 316). Note, the steps 302-316 may be performed in different order than sequential as listed. That is, the ingress node steps 310-316 can be performed before the egress node steps 302-308.

The egress node can be connected to the ingress node over a packet network, the signal can be a wireless signal, and the presentation time can be when a radio should transmit the specific part. The adjustment can be configured to preserve a clock phase of the global reference time at the egress node. The adjustment can be configured to either speed up or slow down the clock to minimize the time error. The presentation time can be determined by adding a constant time delay to a reception time of the specific part. The signal can be a Radio over Ethernet (RoE) packet stream encapsulating a Common Public Radio Interface (CPRI) signal. The presentation time can be included in an orderInfo field in a RoE header.

In another embodiment, an egress node includes circuitry configured to synchronize with a global reference time, receive a signal including a presentation time for when a specific part of the signal is to be transmitted, wherein the presentation time was determined by the ingress node with reference to the global reference time, determine an actual transmission time when the specific part of the signal is transmitted, and cause adjustment of a clock based on a time error derived from a difference between the presentation time and the actual transmission time.

In a further embodiment, an ingress node includes circuitry configured to synchronize with a global reference time, receive a signal for transmission to the egress node and detect a reference therein with respect to the global reference time, determine a presentation time for when the reference in the signal is to be transmitted at the egress node, and transmit the signal to the egress node with the presentation time included therein for the egress node to adjust its clock based on a time error derived from a difference between the presentation time and an actual transmission time.

RoE Architecture

Figure 7:
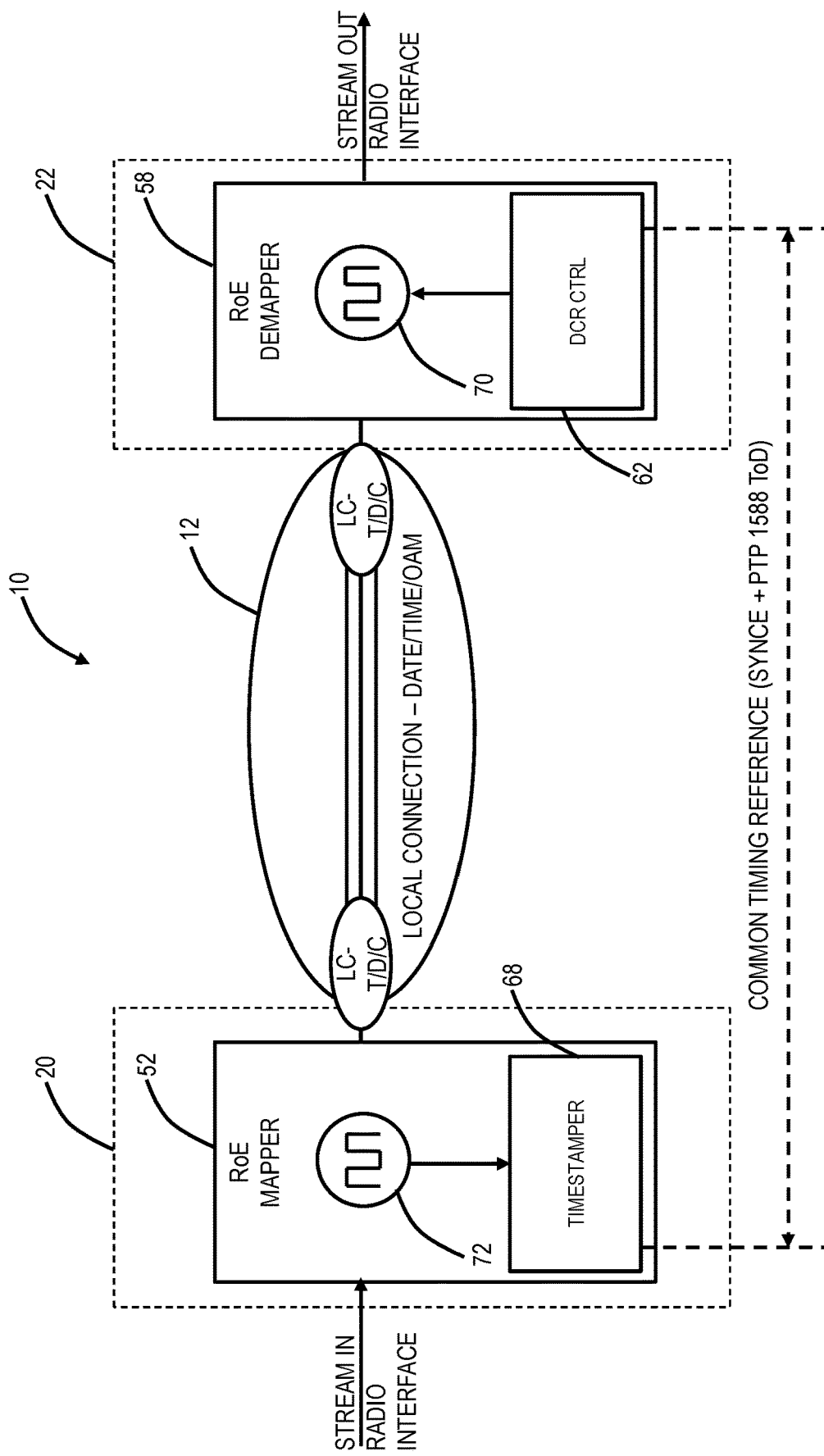
FIG. 7 is a network diagram of a portion of the network of FIG. 1 illustrating components at the nodes that are connected by the packet network for describing the RoE architecture.

FIG. 7 is a network diagram of a portion of the network 10 illustrating components at the nodes 20, 22 that are connected by the packet network 12 for describing the RoE architecture. Again, for illustration purposes, the node 20 includes the mapper 52 and the node 22 includes the demapper 58, interconnected via the packet network 12. The mapper 52 can include timestamper functionality 68 and the demapper 58 can include the DCR control functionality 62, and each of the functionality 62, 68 can be circuitry configured to implement various functions. The objective of the DCR control functionality 62 and the timestamper functionality 68 and is to provide a common time reference (e.g., SyncE and PTP 1588 ToD).

The DCR algorithm is used to recover a clock 70 at the demapper 58 so that a stream output over a radio interface can match the input of a clock 72 at the mapper 52, so that there is no underrun or overrun causing packet loss or packet variation, out of range of the application requirements. For the DCR algorithm, there is a need to convey a timestamp, from the timestamper functionality 68 on the mapper 52, to the demapper 58, such that the clocks 70, 72 have a common reference. As described herein, RoE IEEE 1914.3 includes the orderInfo field for a possible timestamp, but this typically is used for a sequence number and is thus unavailable to provide a timestamp.

RoE Timestamp

The present disclosure extends the RoE standard for carrying timestamps, by either using the existing "VSD—vendor specific data" opCode of the Control Packet sub-Type, or a new opCode specifically for a timestamp with approval of ROE standard or repurpose of one of the reserved opcode This approach could be applied to not only the current SA-TM emulation technique, but to any future emulation technique or other existing emulation techniques, so that any RoE data type can be covered by providing a generic opcode of timestamp while operating within compliance of IEEE 1914.3.

Figure 8:
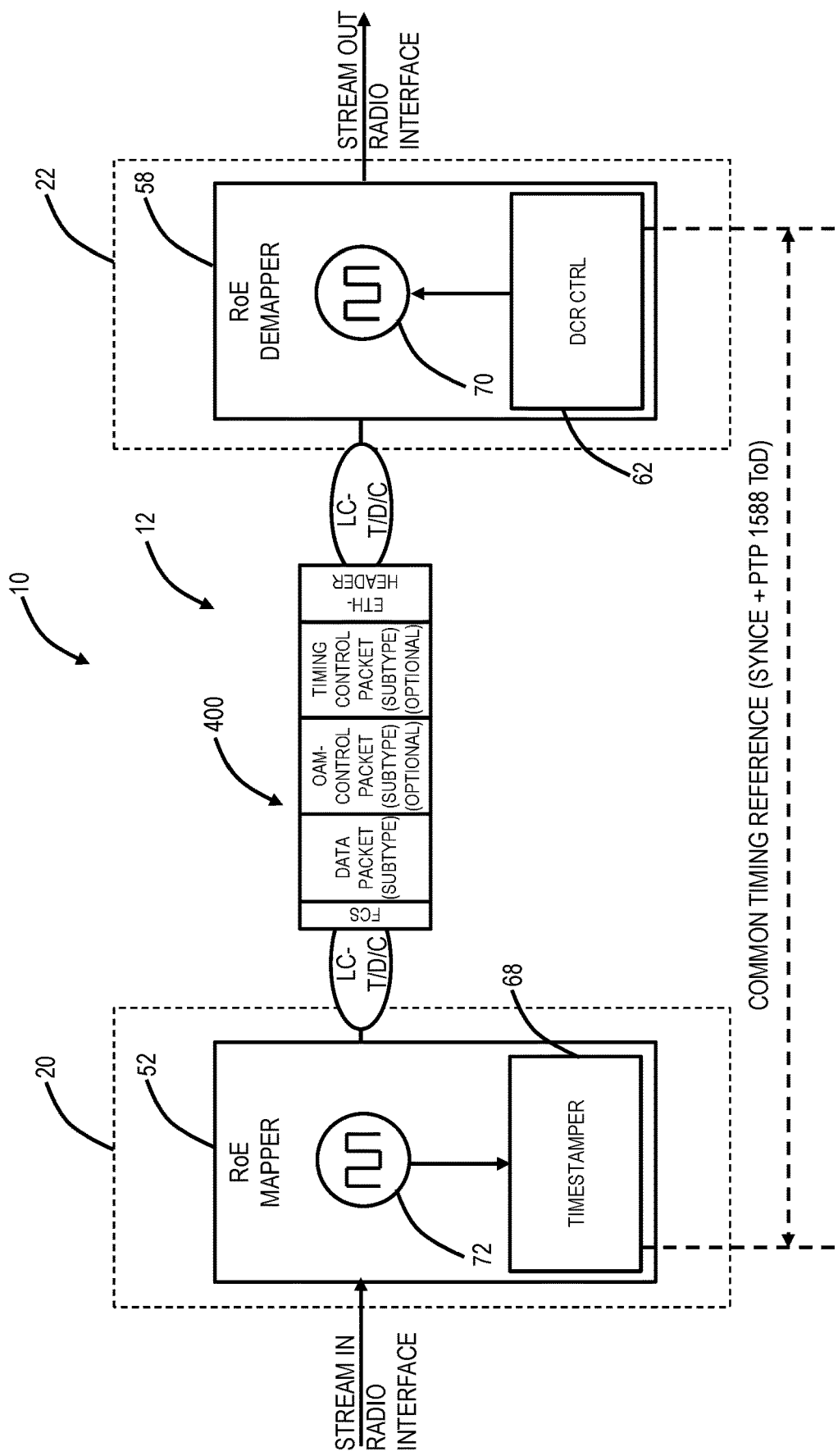
FIG. 8 is a network diagram the network as illustrated in FIG. 7 with an example control packet over the packet network for conveying a timestamp.

FIG. 8 is a network diagram the network 10 as illustrated in FIG. 7 with an example packet 400 over the packet network 12 for conveying a timestamp. RoE defines a subtype of a timing control packet, an Operations, Administration, and Maintenance (OAM) control packet, and a data packet with subtypes, and all of which include a common header. A structure-agnostic data packet does not use the OAM and timing control data, and only has one flow. In a line mode, the data packet uses a timestamp in the orderInfo field in the packet header, and in a tunnel mode, the data packet uses a sequence number in the orderInfo field. Thus, not all data packets have the timestamp.

The present disclosure includes use of a control packet to convey the timestamp. The control packet can have a control subtype opcode as defined in IEEE 1914.3-2007. In an embodiment, the opcode can be a Vendor Specific Data (VSD) opcode, e.g., 00000010b. In another embodiment, the opcode can be one selected from a reserved or unused range of opcodes, e.g., 00000100b. Of note, the mapper 52 and the demapper 58, along with the DCR control functionality 62 and the timestamper functionality 68, are configured to understand and process the selected opcode for the exchange of timestamp data. The control packet includes a data structure therein to convey the timestamp for DCR.

Figure 9:
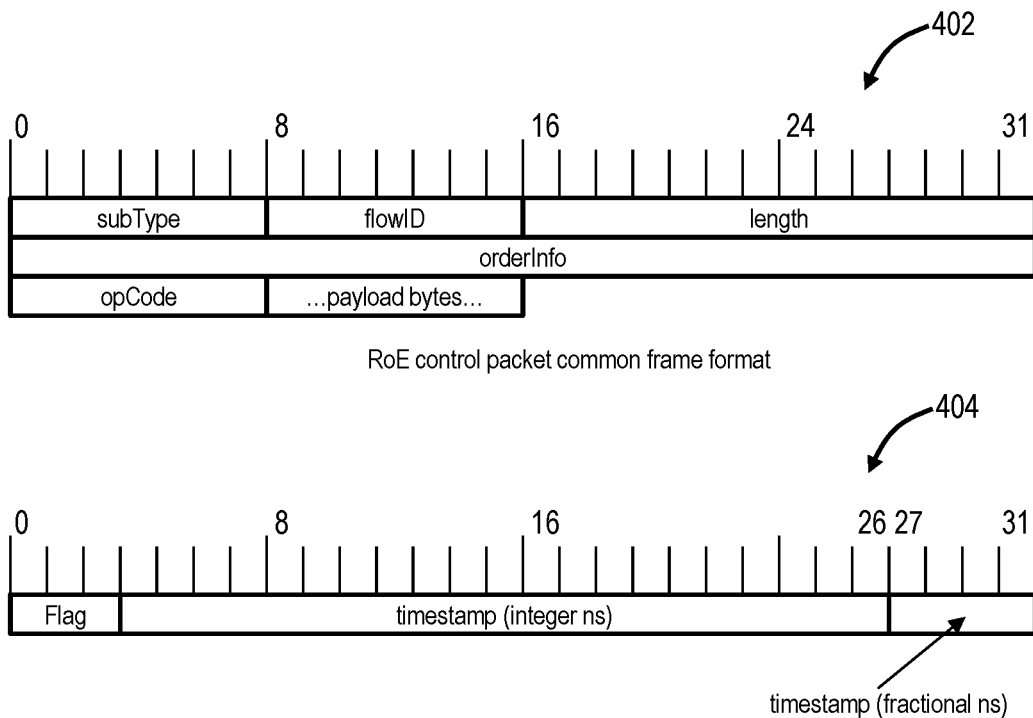
FIG. 9 is a block diagram illustrating an RoE control packet common frame format and a payload.

The data structure can include a data subtype and packet format makes use of the RoE common frame format with the payload carrying the timestamp information. FIG. 9 is a block diagram illustrating an RoE control packet common frame format 402 and a payload 404. The RoE control packet common frame format 402 is from the RoE Specification, specifically FIG. 20 therein. The payload 404 includes a flag field, a timestamp ns (nanosecond) field, and a timestamp fractional ns field.

The control packet common frame format 402 includes a subtype field, a flowID field, a length field, an orderInfo field, an opcode field, and the payload 404. Specifically, the payload 404 is in the payload bytes of the control packet common frame format 402.

In an embodiment, the overall data structure of the control packet common frame format 402 can include

| Field | Example value | Notes |
| --- | --- | --- |
| SubType | 0x0 (0000,0000b) | defined by 1914.3 as control packet (i.e for OAM, timing) |
| Opcode | 0x2 (0000,0010b) | defined by 1914.3 as VSD (vendor specific data) |
| FlowId | 0xff (1111,1111b) | required to be all ones by 1914.3 |
| Length | Various | 4 bytes - the length of the payload 404 |
| orderInfo | Sequence number | |
| Flag | 1 or 0 | 1: timestamp by frequency; 0: timestamp by PTP synchronized ToD |

The payload can include

| Bits | Value |
| --- | --- |
| 0:2 | flag, 1: timestamp by frequency; 0: timestamp by PTP synchronized ToD |
| 2:26 | timestamp of ns |
| 27:31 | Fractional ns |

Timestamp Operation of the Mapper

Figure 10:
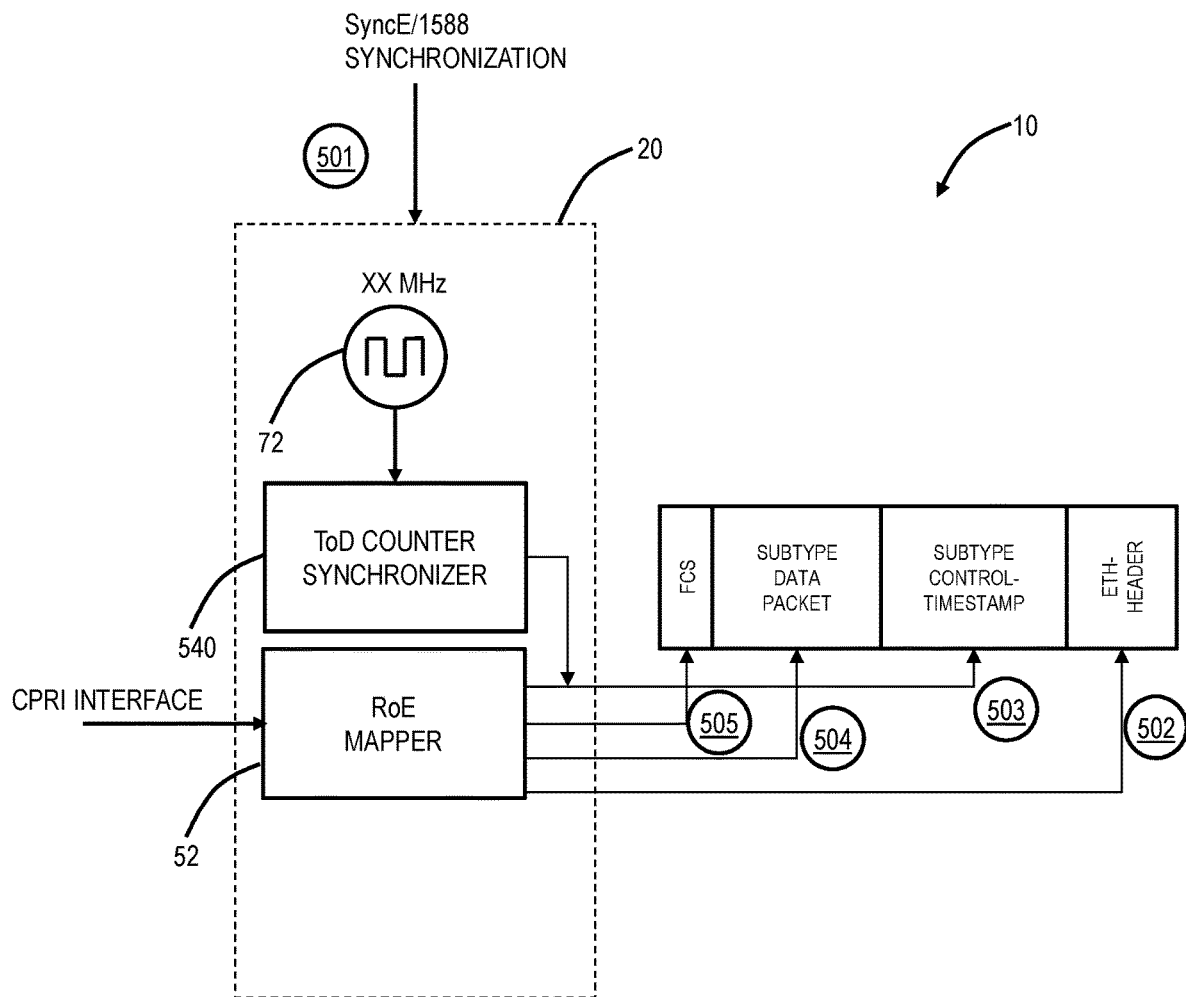
FIG. 10 is a diagram of a node illustrating timestamp operation at the node with a mapper 52.

FIG. 10 is a diagram of the node 20 illustrating timestamp operation at the node 20 with the mapper 52. In this example, a subtype of a control VSD timestamp is built into the Ethernet frame in the RoE mapper 52. The clock 72 can by synchronized by SyncE and/or PTP 1588, and a ToD counter synchronizer 540 can connect to the clock (step 501). The RoE mapper 52 is configured to build an Ethernet header (step 502). The RoE mapper 52 is configured to retrieve a timestamp value from the timestamper functionality 68 and build the subtype of a control timestamp (step 503). The RoE mapper 52 receives an incoming radio stream (e.g., from the CPRI interface) and incorporates the data in a data packet (step 504). Finally, the RoE mapper 52 builds a Frame Check Sequence (FCS) and the frame is sent (step 505).

Timestamp Operation of the Demapper

Figure 11:
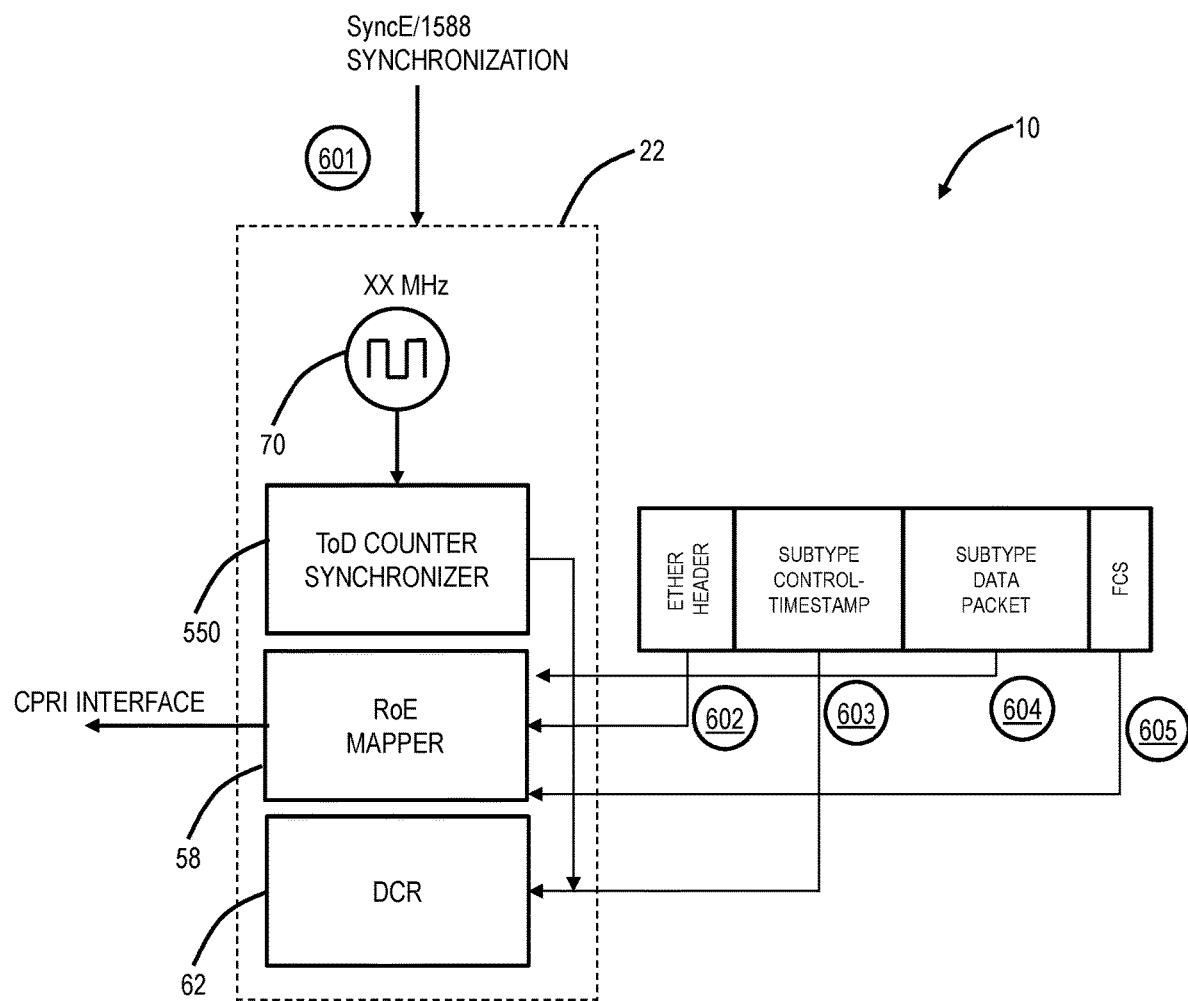
FIG. 11 is a diagram of a node illustrating timestamp operation at the node with a demapper.

FIG. 11 is a diagram of the node 22 illustrating timestamp operation at the node 22 with the demapper 58. In this example, a subtype of a control VSD timestamp is extracted from the Ethernet frame in RoE demapper 58, via the DCR control functionality 62. The clock 70 can by synchronized by SyncE and/or PTP 1588, and a ToD counter synchronizer 550 can connect to the clock (step 601). The RoE demapper 58 extracts the Ethernet header (step 602). The RoE demapper 58 decapsulates the subtype of the control timestamp (step 603). The demapper 58 decapsulates the data packet subtype (step 604). Finally, if the FCS indicates a valid timestamp, the timestamp is pushed to the DCR functionality 62.

Timestamp Process

Figure 12:
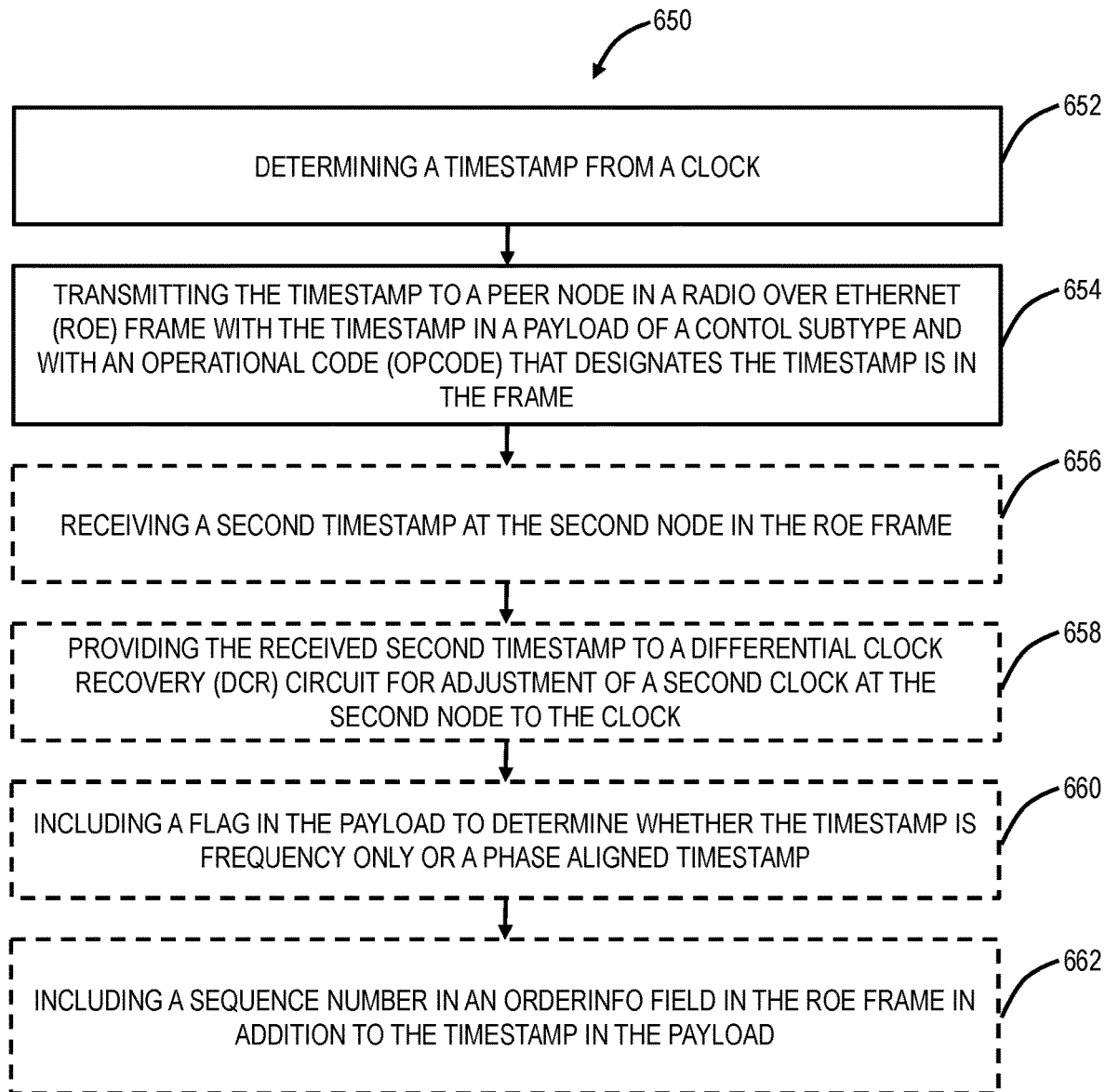
FIG. 12 is a flowchart of a process for conveying a timestamp in a RoE Ethernet frame.

FIG. 12 is a flowchart of a process 650 for conveying a timestamp in a RoE Ethernet frame. The process 650 includes determining a timestamp from a clock (step 652); and transmitting the timestamp to a second node in a Radio over Ethernet (RoE) frame with the timestamp in a payload and with an operational code (opcode) that designates the timestamp is in the frame (step 654). The process 650 can further include receiving a second timestamp at the second node in the RoE frame (step 656), and providing the received second timestamp to a Differential Clock Recovery (DCR) circuit for adjustment of a second clock at the second node to the clock (step 658).

The opcode can designate Vendor Specific Data (VSD). The opcode can be one of a code from a reserved or undefined opcodes. The process 650 can further include including a flag in the payload to determine whether the timestamp is frequency only or a phase aligned timestamp (step 660). The process 650 can further include including a sequence number in an orderInfo field in the RoE frame in addition to the timestamp in the payload (step 662).

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A node comprising:
a clock; and
mapper circuitry configured to
generate a timestamp from the clock, and
transmit the timestamp to a peer node in a Radio over Ethernet (RoE) frame as defined in IEEE 1914.3 with the timestamp in a control subtype of the RoE frame and with an operational code (opcode) in the RoE frame that designates the timestamp is in the frame.

2. The node of claim 1, further comprising:
a demapper circuit configured to
receive a second timestamp from the peer node in a second RoE frame with the second timestamp in the control subtype of the second RoE frame and with an operational code (opcode) that designates the second timestamp is in the frame, and
provide the received second timestamp to a Differential Clock Recovery (DCR) circuit for adjustment of the clock.

3. The node of claim 1, wherein the opcode designates Vendor Specific Data (VSD) from the control subtype.

4. The node of claim 1, wherein the opcode is one of a code from a reserved or undefined opcodes from the control subtype.

5. The node of claim 1, wherein the mapper circuitry is further configured to
include a flag in the control subtype to determine whether the timestamp is a frequency only timestamp or a phase aligned timestamp.

6. The node of claim 1, wherein the control subtype includes an integer and a fractional value for the timestamp.

7. The node of claim 1, wherein the mapper circuitry is further configured to
include a sequence number in an orderInfo field of the control subtype in the RoE frame in addition to the timestamp in the control subtype.

8. A node comprising:
a clock; and
a demapper circuit configured to
receive a timestamp from a peer node in a Radio over Ethernet (RoE) frame as defined in IEEE 1914.3 with the timestamp in a control subtype of the RoE frame and with an operational code (opcode) in the RoE frame that designates the timestamp is in the frame, and
provide the timestamp to a Differential Clock Recovery (DCR) circuit for adjustment of the clock.

9. The node of claim 8, further comprising:
mapper circuitry configured to
generate a second timestamp from the clock, and
transmit the second timestamp embedded in the control subtype of a second RoE frame to the peer node.

10. The node of claim 8, wherein the opcode designates Vendor Specific Data (VSD) from the control subtype.

11. The node of claim 8, wherein the opcode is one of a code from a reserved or undefined opcodes from the control subtype.

12. The node of claim 8, wherein the demapper circuitry is further configured to
receive a flag in the control subtype to determine whether the timestamp is a frequency only timestamp or a phase aligned timestamp.

13. The node of claim 8, wherein the control subtype includes an integer and a fractional value for the timestamp.

14. The node of claim 8, wherein the demapper circuitry is further configured to
receive a sequence number in an orderInfo field in the RoE frame in addition to the timestamp in the control subtype.

15. A method comprising:
generating a timestamp from a clock; and
transmitting the timestamp to a peer node in a Radio over Ethernet (RoE) frame as defined in IEEE 1914.3 with the timestamp in a control subtype of the RoE frame and with an operational code (opcode) in the RoE frame that designates the timestamp is in the RoE frame.

16. The method of claim 15, further comprising:
receiving a second timestamp from the peer node in a second RoE frame with the second timestamp in the control subtype of the second RoE frame and with an operational code (opcode) that designates the received second timestamp is in the received second RoE frame, and
provide the received second timestamp to a Differential Clock Recovery (DCR) circuit for adjustment of the clock.

17. The method of claim 15, wherein the opcode designates Vendor Specific Data (VSD) from the control subtype.

18. The method of claim 15, wherein the opcode is one of a code from a reserved or undefined opcodes from the control subtype.

19. The method of claim 15, further comprising:
including a flag in the control subtype to determine whether the timestamp is a frequency only timestamp or a phase aligned timestamp.

20. The method of claim 15, further comprising:
including a sequence number in an orderInfo field of the control subtype in the RoE frame in addition to the timestamp in the control subtype.

\* \* \* \* \*